May 5, 1964

J. L. GRATZMULLER 3,131,717

PRESSURE REDUCING DEVICES

Filed Sept. 18, 1961

United States Patent Office 3,131,717

Patented May 5, 1964

3,131,717

PRESSURE REDUCING DEVICES

Jean Louis Gratzmuller, 66 Blvd. Maurice Barres, Neuilly-sur-Seine, France

Filed Sept. 18, 1961, Ser. No. 138,702
Claims priority, application France Sept. 23, 1960
4 Claims. (Cl. 137—505.23)

This invention relates to pressure-reducing devices and more particularly to such devices for use in installations in which a low-pressure service line has to be fed from a high-pressure fluid source and in which the service pressure must be kept constant with high accuracy in spite of considerable variation of the source pressure and of considerable variation of the mass-flow demand on the service line.

The device to which the invention relates is of the kind comprising a valve, operative between the pressure-fluid source and the service line and controlled by a movable member, such as a diaphragm or piston, subjected on one face to the pressure subsisting downstream of the valve.

In conventional devices of this kind the valve-controlling member is subjected, not only to the static pressure of the fluid but also to the dynamic effects of the fluid escaping through the valve orifice at high velocity (which may reach transsonic values) with the result that control of the service pressure is not precise and that, although the mean service pressure may be constant, the instantaneous pressure may fluctuate widely; and the more pronounced is this dynamic effect on the valve-controlling member compared with the static pressure to which it is subjected, the more irregular will be the control of the service pressure.

An object of this invention is a pressure-reducing device of the general kind above-mentioned incorporating "tranquilising" means for dissipating the dynamic effect of high-velocity escape of fluid through the valve orifice before the fluid can reach and act upon the valve-controlling member or enter the service line.

The tranquilising means preferably comprise a labyrinth, through which fluid discharged from the valve orifice must pass before reaching the service line and the valve-controlling member.

The valve preferably comprises a closure member, such as a disc or the like, seatable on a seating surrounding the discharge orifice and mounted on an axial rod or stem; and further objects of the invention are the provision of improved means of guiding the rod or stem, and means for protecting the guiding means against abrasion by dust (or other particles of solid matter) suspended in the fluid.

A yet further object of the invention is a pressure-reducing device having, in addition to the main advantage of eliminating the detrimental dynamic effect above-mentioned, the desirable qualities of simplicity, robustness, low first cost, small bulk, reliability and substantially instantaneous response to variations of source pressure and of mass-flow demand.

How the foregoing objects and such other as may hereinafter appear are achieved and how the invention may be carried into practice, will be more fully understood from the following description, having reference to the accompanying drawings, of an embodiment of the invention, given by way of example only and without implied limitation of the scope of the invention, which is defined in the hereto appended claims.

Figure 2:
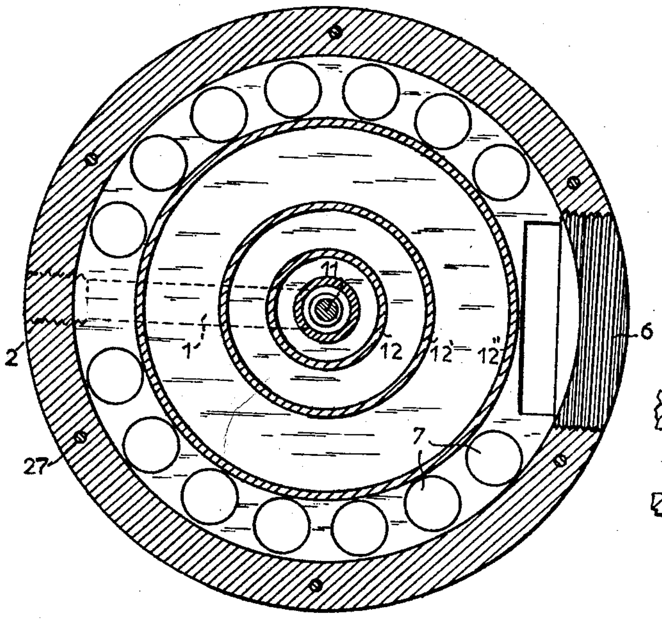
FIGURE 2 is a section on the line A—A of FIGURE 1.

Referring to the drawings, the pressure-reducing device comprises a cylindrical body, made for convenience in three parts 26, 25 and 15, held together by tie-bolts 27. In the body are formed a gas inlet 1, screw-threaded at 2 for connection to a pipe (not shown) leading from the high-pressure gas source, a lower chamber 3 communicating with the inlet 1 via an orifice 4, which provides a seating for a valve closure member, in the form of a disc 5 located in chamber 3 and an upper chamber 8 enclosed by a flexible diaphragm 9. Disc 5 is mounted on a stem 11, which extends upwardly into chamber 8 and is fixed to the backing plate 10 of diaphragm 9, and which also extends downwardly to terminate in guiding means hereinafter described. Above the diaphragm 9 and backing plate 10 is another chamber 23, the purpose of which is hereinafter described.

Chamber 3 communicates with an outlet 6, formed in the side wall of the body and screw-threaded for connection to the service line (not shown). Chambers 3 and 8 intercommunicate by means of a number of openings 7, extending through the partition separating chambers 3 and 8 and disposed peripherally next the side wall of the body (see FIGURE 2).

In the chamber 3 is a number of concentric cylindrical elements 12, 13, 12′, 13′ and 12″ extending alternately from the upper wall 14 of the chamber and its lower wall formed by the base member 15 and separated from each other by cylindrical passages. The elements 12, 12′, 13, 13′ and 12″ do not extend as far as the opposite wall of the chamber, leaving annular gaps through which mutually adjacent cylindrical passages between mutually adjacent cylindrical elements such as 12, 13 intercommunicate. The orifice 4 controlled by the valve member 5 is at the center of the cylindrical element 12 and the openings 7 lie outside the cylindrical element 12″. The arrangement of cylindrical elements 12, 13, 12′, 13′, 12″ thus constitutes a labyrinth, through which gas discharged from orifice 4, when the valve member 5 is unseated, must pass before reaching the outlet 6 and the openings 7 leading to chamber 8.

The radial width of the cylindrical passages separating the elements 12, 13; 13, 12′; 12′, 13′; 13′, 12″ increases progressively in the radially outward direction. Likewise, the depth of the gaps between the cylindrical elements and the chamber walls 14, 15, respectively, also increases radially outwards; and the depths of these gaps are so selected that their cross-sectional areas are approximately the same as those of the (or one of the) cylindrical passages with which they communicate respectively, so that the cross-sectional area of the labyrinth increases progressively from entry to exit (albeit by small steps, rather than continuously) without local constrictions or enlargements. This arrangement conduces to a progressively decrease of velocity of the gas passing through the labyrinth to a very low value and to the suppression of large-scale turbulence, eddies, dead-regions and general irregularity in the flow.

The arrangement described so far ensures that the pressure in chamber 8 applied to the underside of diaphragm 9 is substantially the same as the static pressure of the gas in the outlet 6 and in the service line connected thereto.

The pressure in chamber 8 acting upwards on the diaphragm 9 is opposed by the weight of the movable assembly comprising the diaphragm itself, its backing plate 10, the valve member 5, its stem 11 and elements mounted thereon as hereinafter described, and also by the pressure in chamber 23 which is vented at 24 either to atmosphere to a region (not shown) in which a predetermined low pressure is maintained. Being itself pressure balanced, as hereinafter explained, the valve member 5 will only be unseated, to admit gas from inlet 1 to chamber 3, when the static pressure in the service line and chamber 8 falls below the predetermined pressure in chamber 23 by an amount corresponding to the weight of the movable assembly. Any demand on the service line will of necessity cause the pressure therein to fall and thereby unseat the valve member 5, until the service pressure again reaches the value at which it is balanced by the opposing forces, viz. the pressure in chamber 23 and the weight of the movable assembly.

Figure 1:
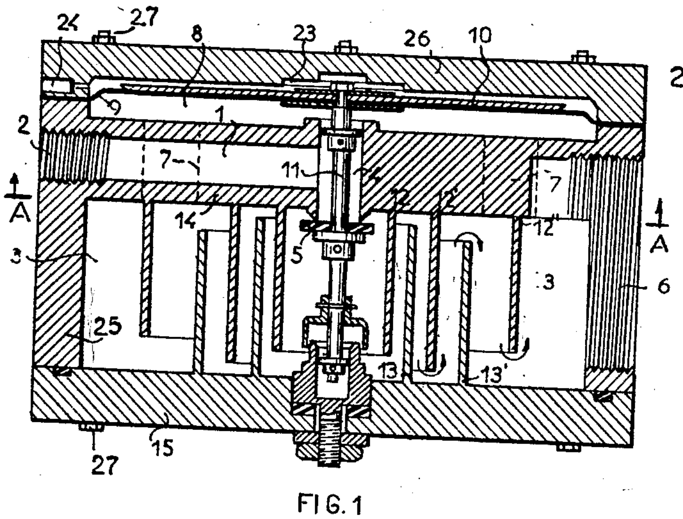
FIGURE 1 is an axial section of the embodiment of a pressure-reducing device for gaseous fluid.

The vent 24 of chamber 23 is preferably provided with a restrictor (as shown in FIGURE 1) to damp the movements of the movable assembly, so as to suppress hammering of the valve member 5 on its seating and over-rapid movements of the valve stem 11, which might cause excessive wear of its guiding means hereinafter described.

Figure 3:
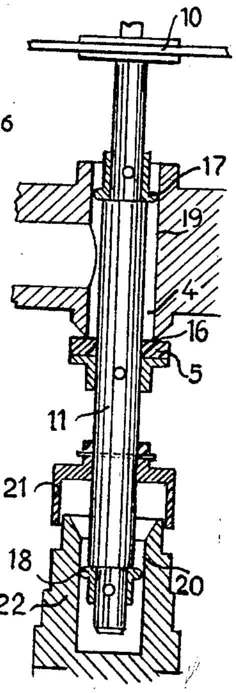
FIGURE 3 is an enlargement of the central portion of FIGURE 1, showing more clearly the guiding means of the valve-stem.

The guiding means of the valve stem 11 comprise a land 17 fixed to the stem 11 as shown in FIGURE 3 (or integral with it) and slidable in a bore 19, which terminates in the orifice 4, and a land 18 fixed to stem 11, as shown in FIGURE 3 (or integral with it) and slidable in a blind bore 20 formed in a thimble 22 sealed into the base 15. (Alternatively, bore 20 could be formed in the base 15 itself). The fit of lands 17, 18 in their respective bores should be an easy sliding fit causing little friction, but land 17 must provide a reasonably effective pressure seal between the inlet 1 and chamber 23.

The axial depth of the chamber 3 needed to accommodate the labyrinth 12 etc. is advantageous for the guidance of the movable valve assembly 5, 11, etc., since it imposes a correspondingly large separation of the guiding means 17, 19 and 18, 20 and the further apart these guiding means are, the more accurate will the guidance be.

As an alternative arrangement, the lands 17, 18, instead of being mounted or formed on the valve stem 11, could be formed on the walls of the bores 19, 20, the cooperating parts of the stem 11 being smooth.

To increase the useful life of the device (without major replacements) the rubbing surfaces of the lands 17, 18 and bores 19, 20 need protection against abrasion (if exposed to it). The gas passing through the device may hold in suspension abrasive solid particles, e.g. dust. The rubbing surfaces of land 17 and bore 19 are not appreciably exposed to abrasion from this source, since the inlet gas in their vicinity is not in movement. Consequently, no special protective means are provided for these surfaces; but the rubbing surfaces of land 18 and bore 20 are exposed to the direct blast of gas discharged at high velocity from orifice 4 when valve member 5 is unseated. In the illustrated embodiment, these surfaces are protected from abrasion by solid particles suspended in the discharged gas by a cap 21 mounted on the stem 11. Cap 21 has a skirt which overlaps, with a small working clearance, i.e. without actual contact, the outer wall of nipple 22, thus effectively excluding dust (and other abrasive particles) from access to the rubbing surfaces 18, 20.

Having described the structure of the device, detailed description of its operation is unnecessary, since it is implicit in the structure. The labyrinth 12, etc., dissipates the dynamic effect of the high velocity discharge of gas from orifice 4 so that the valve-controlling diaphragm is subjected only to the static outlet pressure, which is thereby constant to a high degree of accuracy. Response of the diaphragm 9 to variations of inlet pressure and mass-flow demand of the service line can be made substantially instantaneous by keeping the total length of the labyrinth passage as small as possible consistently with the overriding requirement of substantially complete dissipation of dynamic effect. Moreover, superior guidance of the movable valve assembly and protection of rubbing surfaces exposed to abrasion by suspended solid particles are achieved.

The labyrinth construction constituted by the cylindrical elements 12, etc., provides a path for the gas discharged from orifice 4 of sufficient length, associated with progressively increasing cross-sectional area, to tranquilise the discharged gas within as small as possible an overall volume; and other features described conduce to accuracy of valve guidance and consequent accuracy of pressure control and extended life of working parts.

From the constructional aspect, the subdivision of the body into three parts promotes ease of manufacture. The periphery of the diaphragm 9 is nipped between the cover piece 26 and the main body part 25 and provides an effective seal between them. The joint between the base 15 and the body part 25 is sealed by seal ring (shown in FIGURE 1). The cylindrical elements 12, 13, etc., may be formed integrally with the body part 12 and base 15 respectively either by casting or machining.

As illustrating the accuracy of pressure control obtainable with a device according to the invention, a device as hereinbefore described with reference to the drawings may have an inlet pressure of between 300 and 400 gm./cm.$^2$ and be designed to deliver gas to the service line at a pressure of 2 gm./cm.$^2$ above atmosphere. Such a device will control the service pressure to an accuracy of $\pm 0.1$ gm./cm.$^2$ with a delivery to the service line of approximately 100 m.$^3$/hr. In achieving a control accuracy of this order, the accurate guidance, with low friction, of the movable valve assembly furnished by the means described and illustrated plays an important part. A pressure-reducing device of this character would be suitable for feeding gas to a burner of a furnace with controlled atmosphere.

Some alternative embodiments of the invention will now be briefly described without illustration.

In one such embodiment, the labyrinth 12, etc., is replaced by one or more long tubes, preferably of progressively increasing cross-sectional area. To economise in overall volume, this tube may be coiled into a spiral or helix or a combination of the two. In other embodiments, the labyrinth of concentric cylindrical elements is replaced by a labyrinth formed of baffles disposed to impose on the discharged gas (or other fluid) a zig-zag, spiral, helical or other "contorted" path.

Again, the cylindrical elements 12, 13, etc., may extend from the wall 14 to the wall 15 without gaps, intercommunication between mutually adjacent cylindrical passages between the cylindrical elements being provided by perforating the elements themselves, the perforations being distributed uniformly round the circumference of each cylindrical element and disposed at or near opposite ends of alternate elements.

In addition to the above-mentioned modifications and constructional variants, such others as may be within the competence of those skilled in the art may be made without departing from the scope of the invention as defined in the hereto appended claims.

Having thus described the invention, what is claimed as new and desired to be secured by Letters Patent is:

1. A fluid pressure-reducing device comprising a hollow body, said body having a transverse partition subdividing the interior of the body into a first chamber and a second chamber, said partition having a central orifice communicating with said first chamber, an inlet for high-pressure fluid communicating with said orifice, an outlet for low-pressure fluid in the outer wall of said first chamber, a valve closure member in said first chamber, a seating therefor surrounding said central orifice, a movable member forming a displaceable closure wall of said second chamber opposite said partition, a stem rigidly interconnecting said movable member with said valve closure member, said stem extending through said partition and through said first chamber, low friction means for guiding said stem in said partition and substantially sealing said inlet from said second chamber against pressure leakage, other, low friction, guiding means for said stem arranged in the wall of said first chamber opposite said partition, openings in said partition providing intercommunication between the marginal part of said first chamber, remote from said central orifice, and said second chamber, and labyrinth means in said first chamber providing an extended fluid path from said central orifice to said last-named openings and said outlet, and in which the side wall of the body is cylindrical and the labyrinth means is constituted by a plurality of coaxial cylindrical baffles extending from said partition towards, but not reaching, the opposite wall of said first chamber alternating with other coaxial cylindrical baffles extending from said opposite wall towards, but not reaching, said partition; the radial widths of the cylindrical spaces between mutually adjacent cylindrical baffles and the depths of the gaps, which separate their extremities from said opposite wall and said partition respectively, increasing progressively in the radially outward direction.

2. A fluid pressure-reducing device comprising a hollow body, said body having a transverse partition subdividing the interior of the body into a first chamber and a second chamber, said partition having a central orifice communicating with said first chamber, an inlet for high-pressure fluid communicating with said orifice, an outlet for low-pressure fluid in the outer wall of said first chamber, a valve closure member in said first chamber, a seating therefor surrounding said central orifice, a movable member forming a displaceable closure wall of said second chamber opposite said partition, a stem rigidly interconnecting said movable member with said valve closure member, said stem extending through said partition and through said first chamber, low friction means for guiding said stem in said partition and substantially sealing said inlet from said second chamber against pressure leakage, other, low friction, guiding means for said stem arranged in the wall of said first chamber opposite said partition, openings in said partition providing intercommunication between the marginal part of said first chamber, remote from said central orifice, and said second chamber, and labyrinth means in said first chamber providing an extended fluid path from said central orifice to said last-named openings and said outlet, and in which the side wall of the body is cylindrical and the labyrinth means is constituted by a plurality of coaxial cylindrical baffles extending from said partition towards, but not reaching, the opposite wall of said first chamber alternating with other coaxial cylindrical baffles extending from said opposite wall towards, but not reaching, said partition; the radial widths of the cylindrical spaces between mutually adjacent cylindrical baffles and the depths of the gaps, which separate their extremities from said opposite wall and said partition respectively, increasing progressively in the radially outward direction, and the cross-sectional area of each of said gaps being approximately equal to that of an adjacent cylindrical space.

3. In a fluid pressure regulator comprising a body, a chamber in said body having a top wall, a bottom wall and a cylindrical side wall, said top wall having a central high pressure inlet opening and said cylindrical wall having a low pressure outlet opening, means responsive to the fluid pressure at said outlet opening for moving said valve in accordance with low pressure variations, a plurality of coaxial cylindrical baffles depending from said top wall towards said bottom wall without reaching the latter, and a plurality of coaxial cylindrical baffles alternating with said depending baffles and extending from said bottom wall towards said top wall without reaching the latter, the radial width of the annular spaces between adjacent baffles and the depths of the gaps which separate the free ends of said baffles from said top and bottom walls, respectively, increasing progressively in the radial outward direction.

4. A fluid pressure regulator according to claim 3, in which the cross-sectional area of each of said gaps is approximately equal to that of an adjacent inner annular space.

References Cited in the file of this patent

UNITED STATES PATENTS

| | | |
|---|---|---|
| 342,962 | Hill | June 1, 1886 |
| 718,694 | Chapman | Jan. 20, 1903 |
| 941,153 | Krichbaum | Nov. 23, 1909 |
| 1,645,601 | Lee | Oct. 8, 1927 |
| 2,295,208 | Grove | Sept. 8, 1942 |
| 2,896,658 | Jones | July 28, 1959 |
| 2,937,658 | Stewart | May 24, 1960 |